United States Patent [19]

Snyder et al.

[11] Patent Number: 6,117,196

[45] Date of Patent: Sep. 12, 2000

[54] METHOD OF MANUFACTURING A LEAD ACID CELL PASTE AND BATTERY

[75] Inventors: Shawn W. Snyder, Lakewood; Leland M. Gillman, Denver, both of Colo.

[73] Assignee: Bolder Technologies Corporation, Golden, Colo.

[21] Appl. No.: 08/998,421

[22] Filed: Dec. 24, 1997

Related U.S. Application Data

[62] Division of application No. 08/717,279, Sep. 20, 1996, Pat. No. 5,820,639.

[51] Int. Cl.[7] .................................................... H01M 10/14
[52] U.S. Cl. ........................................... 29/623.5; 429/228
[58] Field of Search ................................ 29/623.5, 623.2; 429/228

[56] References Cited

U.S. PATENT DOCUMENTS

| | | |
|---|---|---|
| 3,050,577 | 8/1962 | Harris et al. . |
| 4,625,395 | 12/1986 | Rowlette . |
| 4,986,317 | 1/1991 | Takahashi et al. . |

*Primary Examiner*—John S. Maples
*Attorney, Agent, or Firm*—Gibson, Dunn & Crutcher LLP

[57] ABSTRACT

An active paste for an lead-acid electrochemical cell which in a preferred embodiment includes tin; a method of manufacturing the same; and an electrochemical cell utilizing the same. The tin may be a tin sulfate, tin oxide, or metallic tin. The active paste sandwiches a primarily lead film which may, but need not, also include tin, to form a positive electrode. One or more positive electrodes are interleafed with a number of negative electrodes, separated by a separator material. The assembly is placed in a container and electrolyte is introduced. In alternate embodiments, the paste may include some combination of antimony, arsenic, germanium, indium, selenium, gallium, tellurium or other semiconductor materials with or without tin compounds.

10 Claims, 8 Drawing Sheets

METHOD OF MANUFACTURING A LEAD ACID CELL PASTE AND BATTERY

This is a divisional application of application Ser. No. 08/717,279, filed on Sep. 20, 1996, now U.S. Pat. No. 5,820,639.

FIELD OF THE INVENTION

The present invention relates to the field of lead-acid electrochemical cells, and more particularly to a lead-acid cell paste formulation including tin compounds and methods of manufacturing and using the same in an electrochemical cell.

BACKGROUND OF THE INVENTION

In known valve-regulated lead-acid (VRLA) batteries, each positive electrode, sometimes called a positive "plate," includes a grid or foil sandwiched between an electrochemically active paste. A number of positive electrodes are alternately interleafed with a number of negative electrodes, sometimes called the negative "plate," with each electrode of one polarity separated from the adjacent electrode of opposite polarity by a porous separator material, typically a glass microfiber mat. The cell is completed by adding electrolyte and subjecting it to a formation charging process that activates it. The entire apparatus is typically contained within a suitable plastic case or other container.

The interface between the grid or foil and the paste is known as the corrosion layer. While all of the chemistry/electrochemistry that takes place here is not well understood, the establishment of a strong, well-defined corrosion layer is felt to be necessary for long cycle life in lead-acid batteries. With some grid/foil alloys, in particular pure lead, lead/calcium and lead/low tin compositions, there is not sufficient corrosion to establish a strong layer and in place of this a so-called "passivation" layer is created by alkaline oxidation of the grid/foil surface. This corrosion/passivation layer is composed primarily of PbO which is protected from neutralization by the sulfuric acid electrolyte by a layer of mixed lead compounds, but primarily lead sulfate. It acts as a perm-selective membrane that allows the underlying PbO to exist in an alkaline environment. This corrosion/passivation layer can act as an electrical insulator or at least reduce the conductivity between the grid/foil and the active material paste and thus can have a dramatic impact on the electrochemical properties of the cell. The corrosion/passivation layer appears to play an integral role in at least two important characteristics of cell performance: self-discharge and cycle life.

The term "self discharge" refers to a series of different chemical reactions within the cell that can reduce the storage time, or shelf life, due to consumption of electrolyte. The open-circuit voltage directly reflects the specific gravity, or concentration of electrolyte within the cell, and it is also linearly proportional to discharge capacity. Any self-discharge reaction that consumes electrolyte reduces both storage time and discharge capacity. Corrosion of the positive grid/foil on open-circuit stand is one mode of self discharge and does consume electrolyte. The term "cycle life" refers to the number of usable cycles of discharge and recharge available from the cell. The cycle life figure is dependent upon a number of conditions under which it is determined, as well as the basic cell construction. For example, a cell which achieves 80% of its initial amp-hour rating after 500 cycles and reaches 50% after 1,000 cycles will have two different "cycle life" values, depending upon the criterion used for termination (80 or 50% of initial capacity). Another measure, related to cycle life, is total usable capacity. This term refers to the sum of the cycles over the life of the cell multiplied by the amp-hours at each cycle. It can also be expressed as the area under the curve produced by a plot of data showing discharge capacity (in amp-hours) versus cycle number.

It can be appreciated that it is desirable for cells to have low self-discharge—or voltage decay—rates. Low self-discharge rates allow for longer storage times without complete loss of capacity. It can also be appreciated that it is desirable for cells to have long cycle life to allow many discharges and recharges before the cell is replaced. It is similarly important that the total usable capacity be high, thereby implying that the amp-hour capacity of the cell is reasonably constant over the bulk of the cycle life. The total usable capacity represents the amount of useful work a cell can provide.

It can also be appreciated from the foregoing and common knowledge within the industry that establishment of a strong corrosion layer during manufacture, formation and cycling will result in a cell with long cycle life. It is also known that grid/foil alloys that produce a strong corrosion layer will be susceptible to ongoing corrosion that will reduce storage time. Conversely, it is known that grid/foil alloys that do not have significant corrosion properties will result in the creation of a passivation layer in the positive plate between the grid/foil and the positive active material. This passivation layer will tend to protect the grid/foil from corrosion but, as mentioned, it will act to inhibit the passage of current during charging and thus can, when severe, result in drastically short cycle life—a phenomenon termed premature capacity loss, or PCL. It should be appreciated that all of the foregoing comments apply only to the positive plate in a lead-acid cell and not the negative plate.

Generally, both the grid/foil and the active material include lead in various compositions along with smaller quantities of other materials. In particular, tin and tin compounds have been used in lead-acid electrochemical cells. For example, U.S. Pat. No. 5,368,961 discloses a cell having a grid alloy of about 2.5% tin. The use of tin in previous cells has generally been confined to having it in the grid/foil metallic alloy, as opposed to including some form of tin in the paste.

It has been found that the inclusion of small percentages of tin in the grid/foil allows some control over the nature of the corrosion/passivation layer that is formed, and thus a corresponding control over the self-discharge and cycle life characteristics of the cell. This is apparently due to the fact that when the grid/foil surface has areas that are relatively high in tin content, either in the grain boundary areas or within the grains themselves, corrosion results in tin, probably in the form of soluble tin(II) or insoluble $SnO_2$, migrating into the corrosion/passivation layer. This tin acts as a conductor to ameliorate the insulative effects of the passivation layer and to thereby enhance the conductivity, and thus the current flow, between the grid/foil and the positive active material. At tin percentages at or below about 1.1–1.3%, true alloys are formed and the tin distribution is relatively uniform. Above about 1.3%, the solubility of tin in lead is exceeded and the grain boundaries and the grains contain relatively high concentrations of tin. In the former case, passivation layers tend to form and dominate cell performance due to the low amount of corrosion of the grid/foil and, hence, low levels of tin compounds in the passivation layer. When the tin content of the grid/foil metal exceeds the 1.3% level, corrosion of the high tin areas takes place and a true corrosion layer forms, with any passivation areas being sporadic or non-existent and, where formed, containing significant levels of tin compounds. From the foregoing discussion, it should be appreciated that these two conditions involve trade-offs between good self-discharge characteristics and good cycling performance. It should also be appreciated that for tin contents of up to about 1.5% the layer between the grid/foil and the positive active material will be some combination of corrosion and passivation structures, and not necessarily exclusively one or the other.

For example, grids/foils having 2–3% tin levels (all percentage figures being by weight) have certain desirable performance characteristics, in comparison with grids/foils such as pure lead or those having about 0.5% tin or less. In particular, a cell with a positive grid/foil with 2–3% tin provides very good cycling performance, i.e., the cell is able to produce many discharge/recharge cycles with good capacity and a high total usable amp-hours. However, such a cell has an undesirably high self-discharge rate such that the storage time is unacceptable for most commercial applications. It is believed that this high self-discharge rate is due to corrosion of the high tin areas and the grain boundaries, thus consuming significant quantities of the sulfuric acid electrolyte and thereby increasing the rate of decrease of the open-circuit voltage.

Cells with grids/foils having about 1% tin or less exhibit much improved self-discharge characteristics, but do not provide the excellent cycle life of cells having grids/foils with 2–3% tin. Because they are true alloys, it is believed that the foils with 1% tin or less have a much reduced corrosion rate compared to the foils with 23% tin. It is believed that this is due to the tin distribution being more or less homogeneous in the true alloys, with no areas of high tin concentrations in the bodies of the grains and a low level of tin enrichment in the grain boundaries (relative to 2–3% tin foils). The 1% tin (or less) foils thus reduce the self-discharge levels of the cells due to limited tin corrosion, but because of this they do not release sufficient tin into the corrosion/passivation layer to improve markedly the cycling performance.

It would thus be desirable to perfect a cell with good self-discharge characteristics as well as good cycle life characteristics. Clearly, a low corrosion rate of the positive grid/foil is necessary for a low self-discharge rate and, due to it being a long-term failure mode, long cycle life. Conversely, a positive foil with a relatively high corrosion rate apparently creates a corrosion layer that is very favorable for long cycle life, but the corresponding self-discharge rate is high and deterioration of the foil will eventually result in cycle life failure. Clearly, the tin content of the positive grid/foil is an important variable with respect to these two sets of characteristics. Moreover, the experiments in altering the tin content of the positive grid/foil suggest that the design of a lead-acid cell involves a compromise, or tradeoff, of those characteristics. It is believed that no commercial lead-acid cell has previously been designed with both a very low self-discharge rate and a very high cycle life.

Japanese patent publication 1979-49538 published Apr. 18, 1979 describes a "ready-to-use lead-acid battery pole plate" in which $SnSO_4$ or SnO was added to "non-activated paste material." This publication is directed toward a system for reducing the storage deterioration in certain kinds of cells. Such deterioration, according to the publication, is due to the production of non-conductive lead oxide between the pole(grid) and the active material. This is now a well-understood phenomenon called "storage passivation" that occurs in the processing of so-called "dry charged" plates.

The publication asserts that such deterioration is diminished by the addition of $SnSO_4$ or SnO of less than 400 mesh to the active material. The mechanism and chemistry of the asserted effect is not specified. Moreover, the asserted advantages based on the experimental results set forth in the publication are marginal at best. For example, the publication indicates that the voltage of a prior art test cell was 1.55V when subjected to a high-rate discharge while the voltages of the cells in accordance with the asserted invention were 1.57 to 1.59V. Similarly, the "self-sustaining period" until the voltage dropped to 1.00V was 3 min. 54 sec. for the prior art test cells and 4 min. 01 sec. to 4 min. 05 sec. for the cells in accordance with the asserted invention. This represents an improvement of only a few percent, which is probably well within the margin of error of the experiment.

The experimental results in the Japanese publication were also less than dramatic for tests conducted after a 10 month storage period. The prior art test cell showed an initial voltage on high-current load of 1.23V and a self-sustaining period until 1.00V of 3 min. 25 sec., while the cells in accordance with the asserted invention showed an initial load voltage of 1.27 to 1.50V and a self-sustaining period until 1.00V of 3 min. 35 sec. to 3 min. 47 sec.

The Japanese publication teaches that the addition of $SnSO_4$ or SnO is to occur prior to the addition of sulfuric acid:

$SnSO_4$ of varied particle sizes (200–400 meshes and under 400 meshes) was added to the lead powder in the ratio of 0.5–3% and was fully mixed before adding sulfuric acid.

The introduction of $SnSO_4$ or SnO prior to the introduction of sulfuric acid appears not to produce an effective paste, for reasons that are not fully understood. The very marginal improvement realized in the experiments set forth in this Japanese publication appear to support that conclusion. In any event, the Japanese publication apparently never issued as a patent in Japan, and no corresponding United States patent has been located. Further, the publication teaches nothing about cycling characteristics or self-discharge characteristics. Finally, the present invention does not depend upon a particular mesh size of $SnSO_4$ or SnO, as proper paste mixing and the resultant electrochemical effects are more effective when the tin salt used is dissolved during mixing.

There have been many prior art methods with the goal of improving cycle performance other than by altering the tin content of the positive grid/foil. Such methods have included, for example, increasing the cell plate stack compression, using high-density active materials, using thick paste layers and using conductive glass fibers in the positive active material. However, these prior-art methods include disadvantages such as difficulties in manufacturing and processing and high material costs.

SUMMARY OF THE INVENTION

The present invention results in excellent cycling performance in terms of cycle life, maximum discharge capacity and total usable amp-hours while at the same time furnishing very low self-discharge levels (i.e., long storage times). Preferably, tin, in the form of $SnSO_4$ or SnO or metallic powdered tin, is introduced into the positive paste material. Different concentrations of tin may be used. It has been observed that paste having 0.3 weight percent soluble tin sulfate combined with plate foils having 1% tin produces good results. It is expected that adding tin to the paste will produce good results with foils having lower tin contents, or even with foils having-no tin whatsoever such as substantially pure lead. Such foils have very low corrosion rates, and thus result in cells with low self-discharge rates. However, they also tend to form a passivation layer between the foil and positive active material, resulting in very short cycle life. The invention may also utilize elements other than tin such as compounds containing antimony, arsenic, germanium, indium, selenium, gallium, tellurium or other semiconductors or combinations thereof.

The addition of tin to the active material is believed to serve two purposes that dramatically increase cycle life while having no detrimental effect on self discharge. First, tin will be incorporated within the passivation layer and by its semiconductor action will allow electronic conduction through the normally poorly-conducting PbO passivation layers. Second, the soluble tin distributed throughout the positive active material will be converted to $SnO_2$ during formation. This $SnO_2$ will plate out on the electroactive lead dioxide active material and will provide a conductive "skeleton" that will result in slightly higher discharge capacity and longer cycle life.

It has been determined unexpectedly that the process by which the tin is incorporated into the paste is critical to improving the performance of the cell along the lines described above. Tin in the form of $SnSO_4$ or other forms must be introduced after the sulfuric acid is added to the paste. It has been found that adding the tin prior to the introduction of sulfuric acid results in an unsuitable paste that performs poorly relative to pastes mixed by the introduction of tin after the addition of sulfuric acid. For paste mixes that do not require the addition of sulfuric acid (i.e., so-called "unsulfated" pastes) the tin form used can be introduced at any time during mixing.

DETAILED DESCRIPTION OF THE INVENTION

Figure 7:
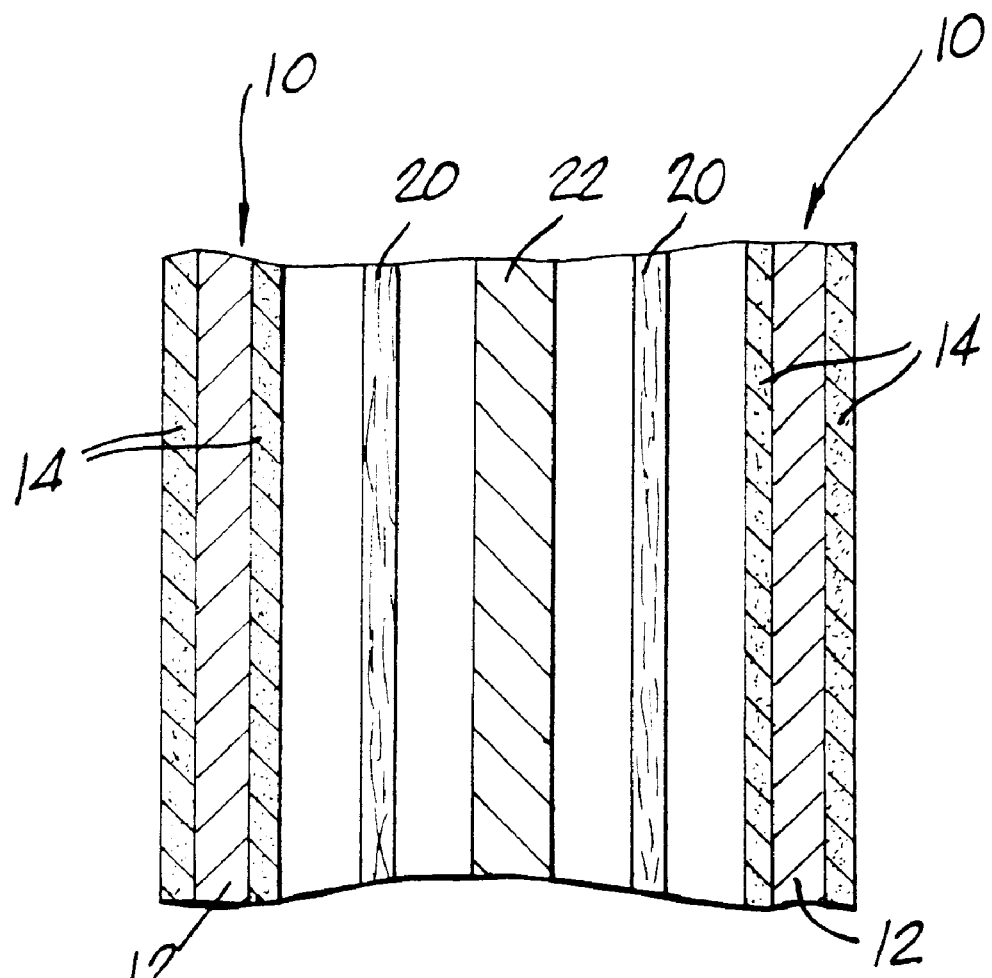
FIG. 7 is a diagrammatic cross section of alternating electrode positive plates of an embodiment of the invention.

With reference to FIG. 7, a lead-acid cell according to the present invention includes positive electrodes or "plates" 10, interleafed with negative electrodes or "plates" 22. The positive and negative plates are separated from one another by a separator 20. The electrodes may be arranged in any physical configuration with respect to one another. Commonly used configurations are to combine a series of stacked electrode plates, or to spirally wind a continuous positive electrode with a continuous negative electrode separated by a porous separator (known as the "spirally wound" configuration). The positive electrodes are electrically connected to a common positive terminal, and the negative electrodes are electrically connected to a negative terminal. The combination is enclosed within a case containing electrolyte (not shown).

In one of the preferred embodiments of the invention, the cell is of the TMF brand thin metallic film type, as disclosed in U.S. Pat. No. 5,368,961 by Juergens. The Juergens design utilizes very thin plates on the order of 0.01 inches or less in thickness, with film thickness on the order of 0.005 inches or less. (The "plate" is used to refer to the metallic film in combination with the paste coated thereon.) Juergens type lead acid cells are characterized by exceptionally high discharge and charge rates, and are well suited to the system of the present invention. However, the present invention is not limited to Juergens type thin plate cells, and is applicable in general to lead acid cells.

The positive electrode 10 of the present invention includes a film 12 coated on each side by active paste material 14. The film 12 is preferably a lead-tin alloy, having about 1% tin. However, the amount of tin may be varied without departing from the scope of the invention. For example, films of up to 3% or more tin may be feasible, and films of less than 0.5% tin or even substantially pure lead may be feasible.

The active paste material 14 preferably includes a mixture of dispersant, sodium sulfate, sulfuric acid, lead oxide, tin sulfate, tin oxide, tin(II) salts or tin(IV) salts or combinations thereof. A content of 0.3% tin sulfate by weight has been found to provide good results. Alternate embodiments of the invention substitute metallic tin for tin sulfate or tin oxide. It is possible that tin introduced via other compounds may also provide acceptable results. Further, similar compounds containing antimony, arsenic, germanium, indium, selenium or combinations thereof in place of or in addition to tin may produce acceptable results.

Sulfuric acid is added into the bulk of the water. Lead oxide is added following the sulfuric acid addition which then reacts with the sulfuric acid to produce lead sulfate. When ⅓ of the total lead oxide is introduced the sulfuric acid is nearly completely reacted. Tin sulfate is pre-dissolved in water. The tin ion and sulfate ion, now resident in the water, are added to the mix after ⅔ of the lead oxide has been introduced. The remainder of the lead oxide is added to complete the mix operation. All components are weighed out as a percentage of the total amount of lead oxide which is to be converted to positive paste: 1.67% water in pre-mix with tin sulfate, 0.27% tin sulfate, 17.43% water for primary mixing, and 0.24% 1.320 s.g. sulfuric acid. Positive paste is applied onto a 2" wide, 15.125" length foil covering an area 1.9" wide by 15.125" in length on both sides with a target applied active material weight of 11.1 grams, for 0.008" thickness.

It has been found that in sulfated pastes (those to which sulfuric acid has been added) it is important that the tin-containing compound be introduced to the paste after the sulfuric acid. Introducing the tin-containing compound prior to the sulfuric acid results in a much poorer performing cell. In the case of unsulfated pastes (those to which sulfuric acid has not been added) the sequence appears not to be critical.

The design and construction of Juergens-type thin metal film cells is further taught in U.S. Pat. Nos. 5,368,961 and 5,198,313 (with respect to the end connectors for such cells), the contents of which are hereby incorporated by reference.

FIGS. 1–6 comparatively illustrate the performance of Juergens-type thin metal film cells according to the present invention and Juergens-type thin metal film cells not having any tin additives in the paste. The capacity of the cells (in amp hours) are plotted as a function of the number of times that the cell is cycled (i.e., discharged and recharged). In these experiments, the discharges were at the 8C rate and the depth of discharge was 100%. The number of cycles multiplied by the amp hours obtained for each cycle yields the total useable capacity of the cell. Cycling is not continued after the amp hours of a cell falls below a nominal percentage of the initial amp hours of the cell, typically 80% or 50%.

Figure 1:
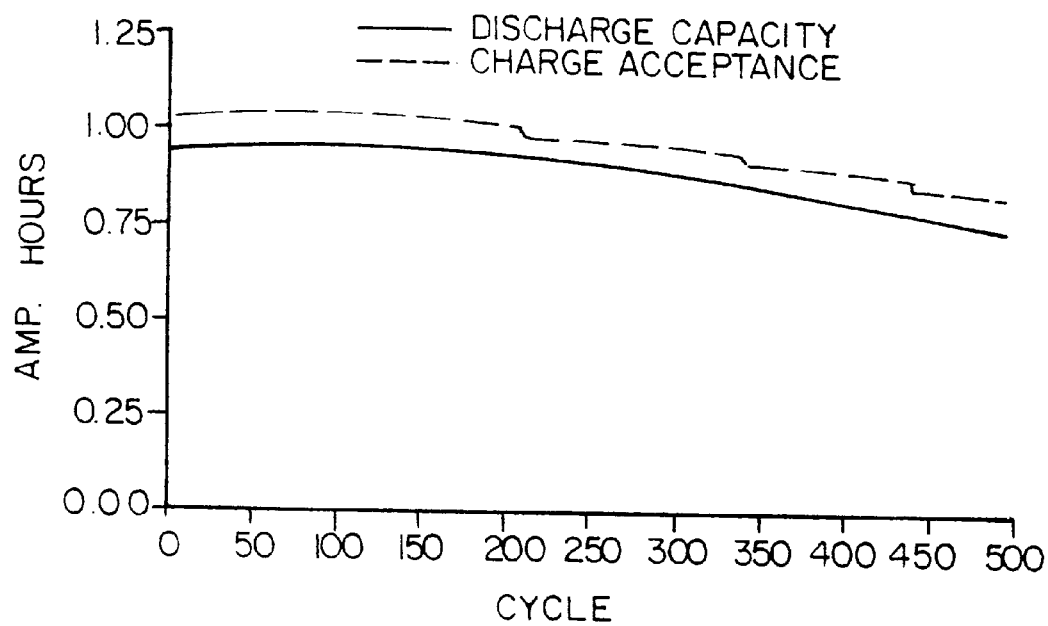
FIGS. 1–3 are test results of amp hours at various cycles for cells with tin-containing pastes according to the present invention.
Figure 2:
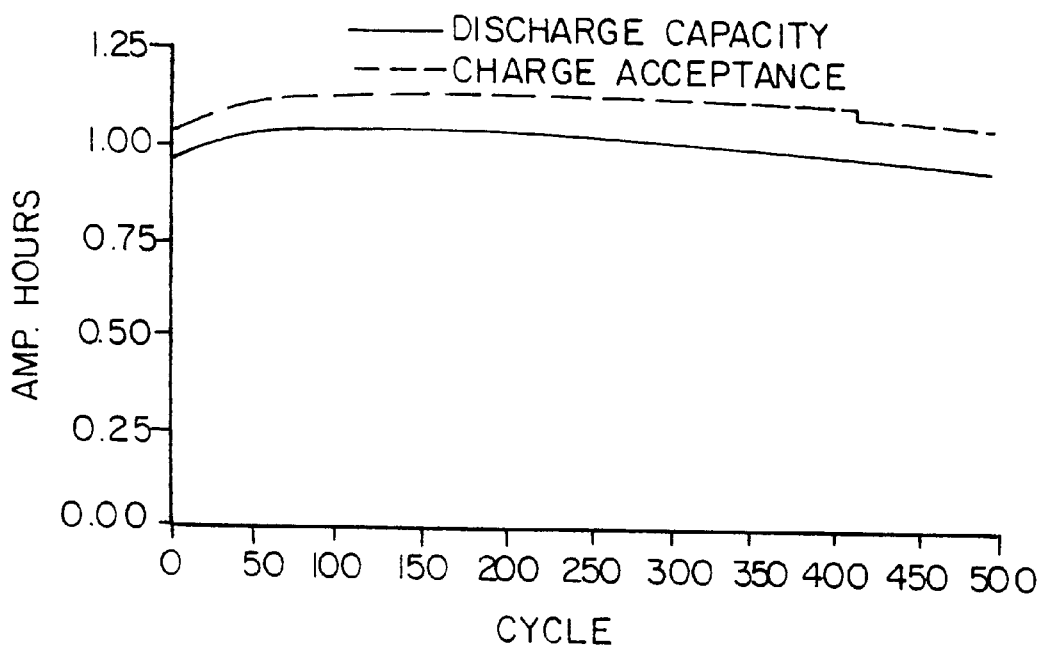
Figure 3:
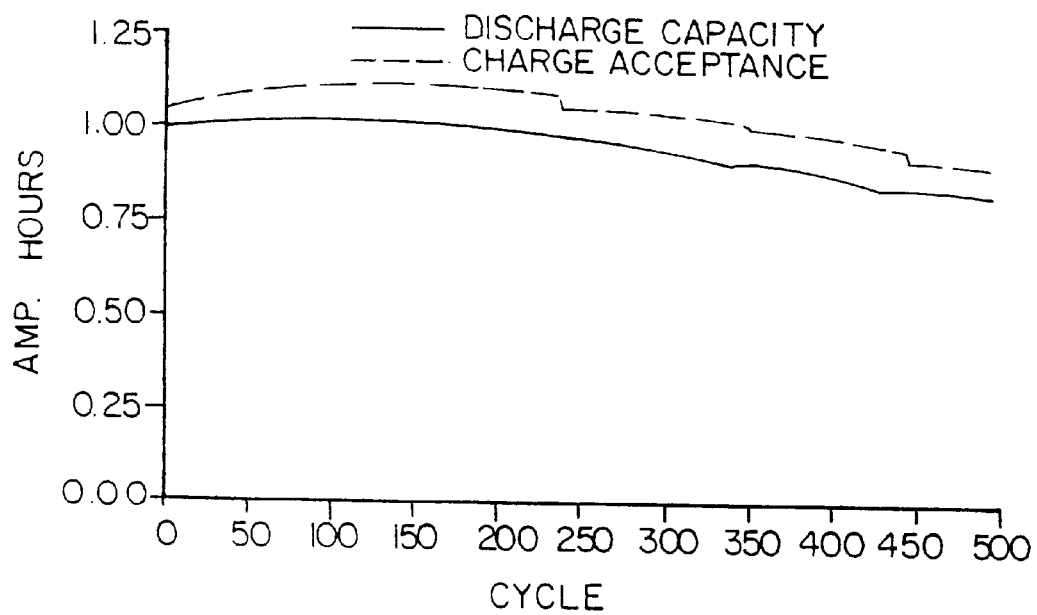

FIGS. 1–3 illustrate cycle performance of Juergens-type thin metal film cells having positive films including 1% tin, and positive active paste including 0.3% tin sulfate. The batteries tested in FIGS. 1–3 all achieved over 440 cycles of at least 80% of initial amp hour values, and achieved over 740 cycles of at least 50% of initial amp hour values.

Figure 4:
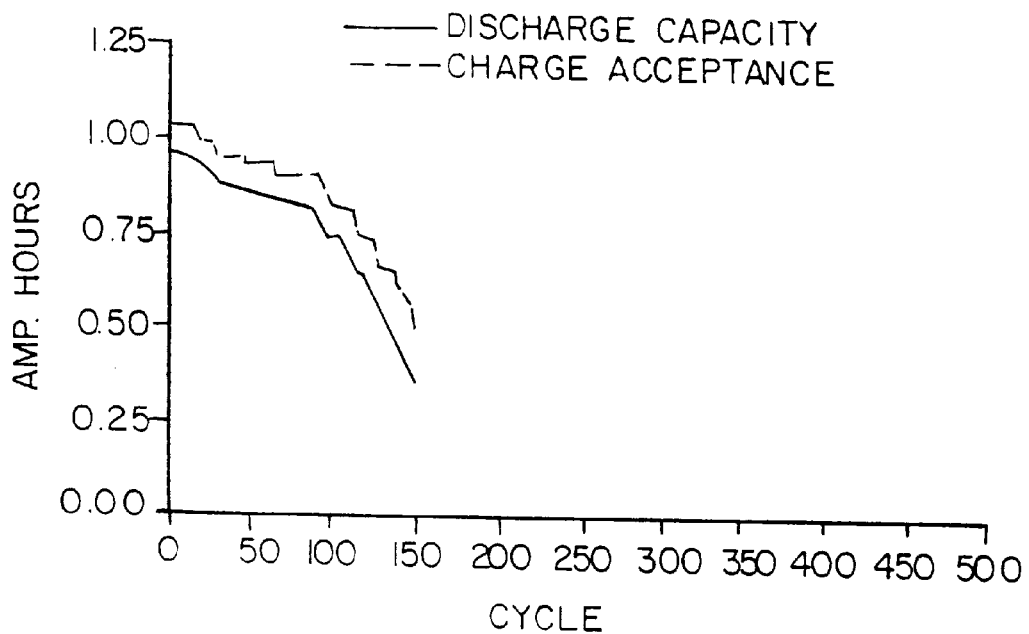
FIGS. 4–6 are comparative test results for cells similar to the cells of FIGS. 1–3, but with non-tin-containing pastes.
Figure 5:
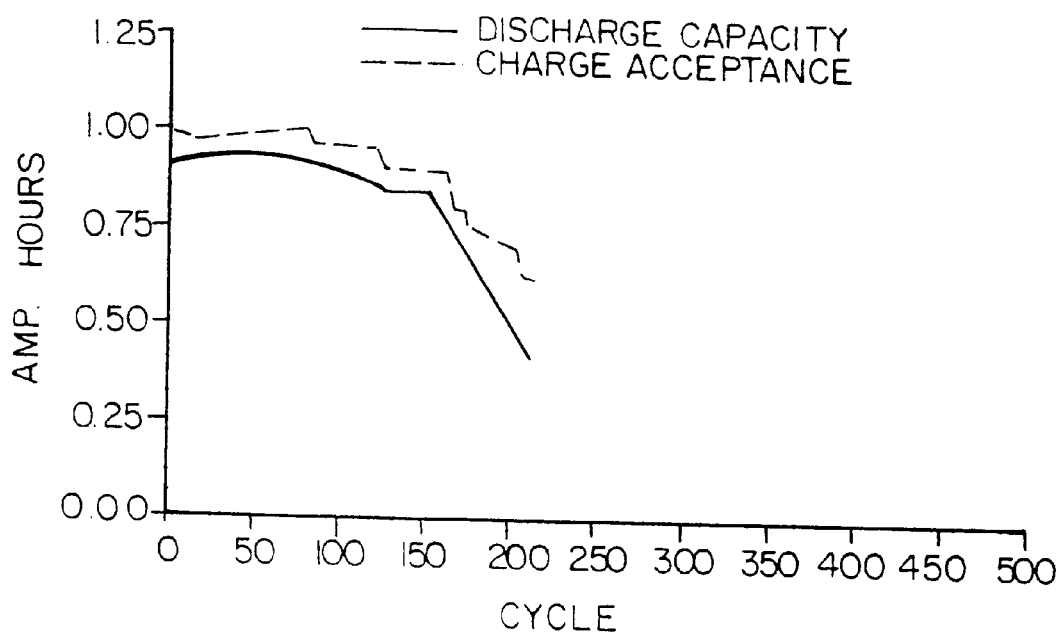
Figure 6:
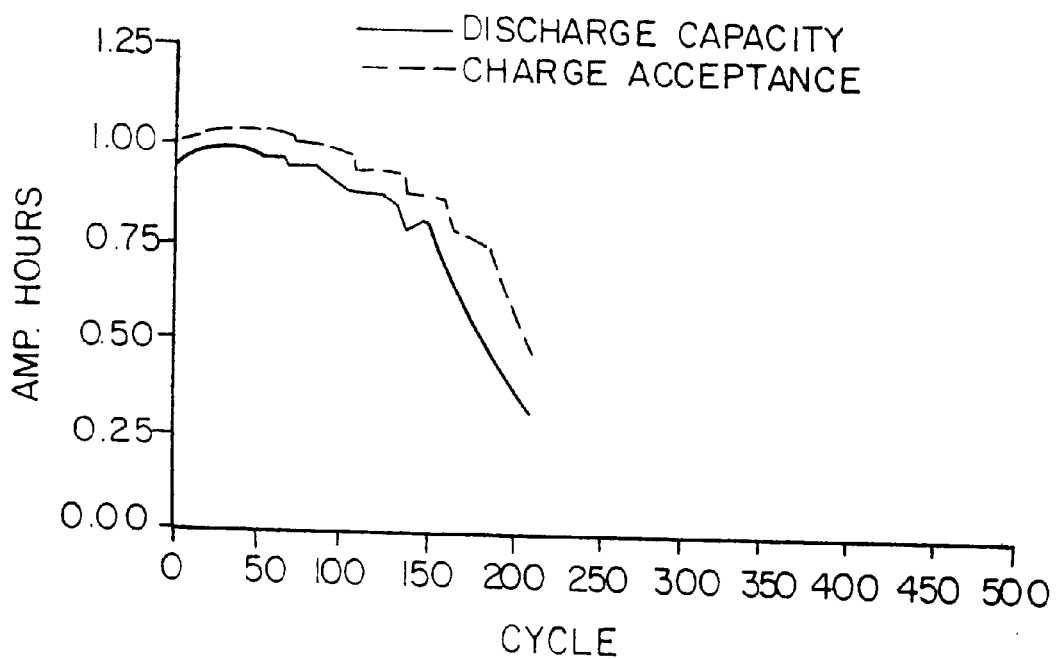

FIGS. 4–6 illustrate cells similar to the cells of FIGS. 1–3, except that tin sulfate has not been added to the active paste. The cells of FIG. 6 all reached less than 170 cycles at 80% of initial amp hours, and less than 210 cycles at 50% of initial amp hours.

As previously noted, the positive electrode may also contain tin as part of a lead/tin alloy. It is believed that the optimum amount of tin in the lead/tin alloy of the positive electrode is on the order of 1%. This figure is based on experiments conducted on cells not having any tin in the paste, which are described below, but it is believed that cells with tin in the paste will produce similar results in this regard.

The self discharge performance of cells having varying amounts of tin in lead/tin alloy electrodes is shown in FIGS. 8–11. All data in these four graphs are from cells with paste material not having any tin compounds. The vertical axis on each graph shows open cell voltage in volts, and the horizontal axis shows the number of elapsed days since formation.

Figure 8:
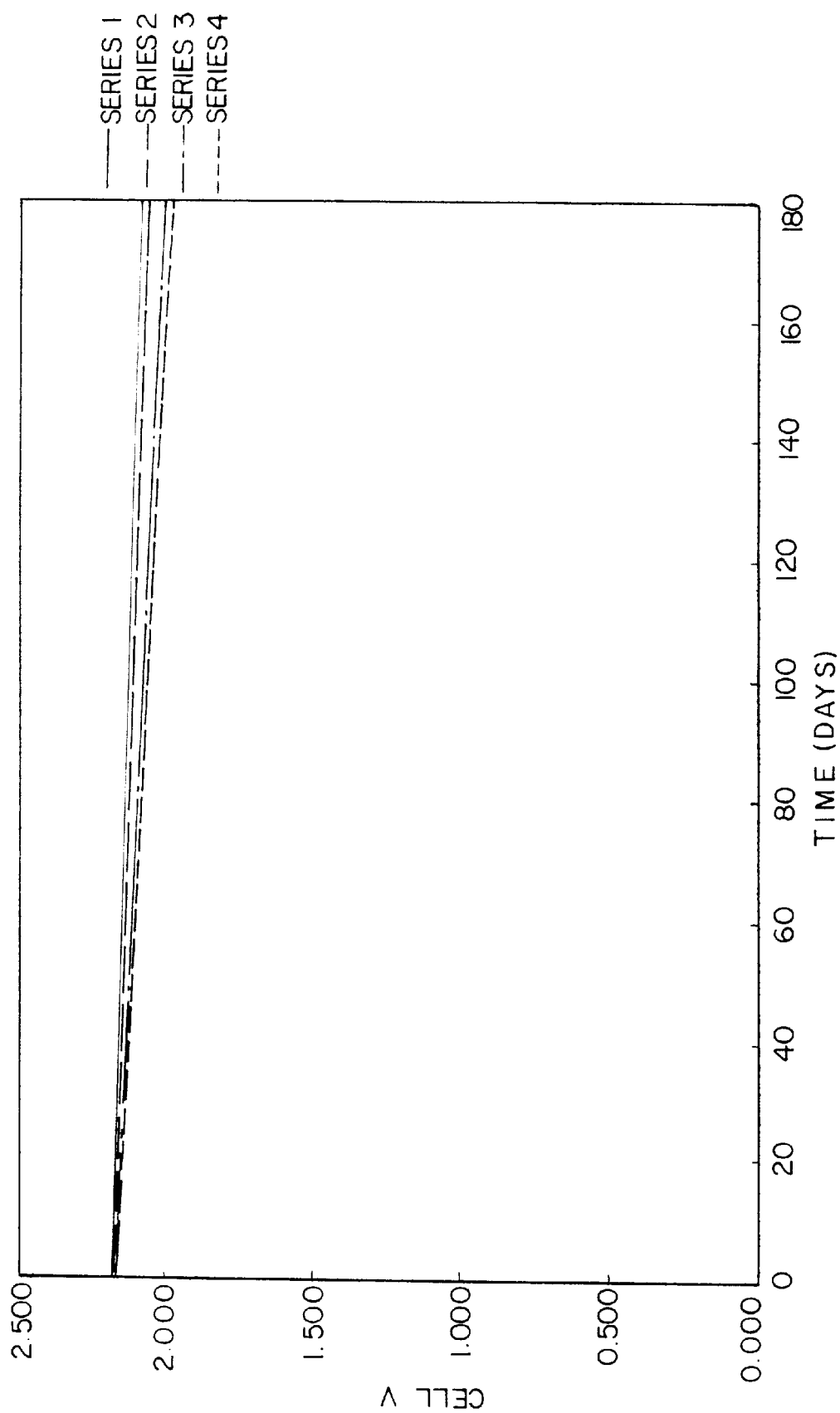
FIGS. 8–11 are test results for several cells in accordance with the present invention having positive electrodes with various tin content.

FIG. 8 shows the self discharge of a set of 16 test samples having positive electrodes of a lead/tin alloy with approximately 1% tin by weight. The test samples are labeled "Series 1, Series 2 . . . ." The cells for which the data of FIG. 8 was collected were stored at room temperature. It can be seen that there is no appreciable drop-off in open circuit voltage for any of the test samples over a storage period of 180 days.

Figure 9:
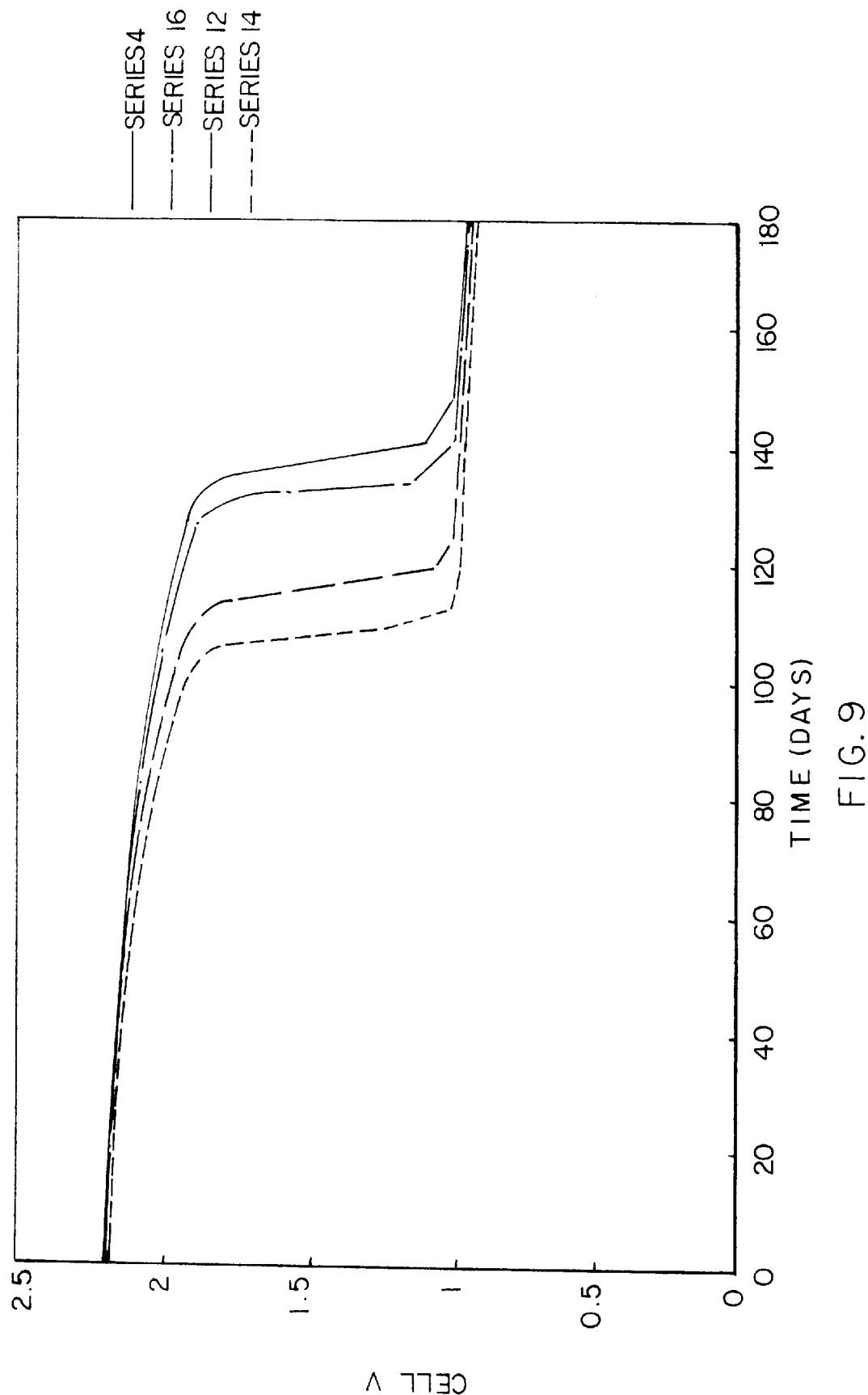

FIG. 9 shows the self discharge of 4 test samples stored at room temperature over a period of 180 days, where the test samples had positive electrodes of lead/tin alloys with approximately 3% tin. Thus the pertinent distinction between the cells of FIG. 8 and the cells of FIG. 9 was the tin content of the positive electrodes; the cells of FIG. 8 had 1% tin while the cells of FIG. 9 had 3% tin. It can be seen from the data of FIG. 9 that cells with 3% tin in the positive electrode had greater self discharge than the cells of FIG. 8 with 1% tin in the positive electrode. In particular, the open circuit voltage dropped abruptly at 100 to 140 days of storage. Although these cells did not have tin in the paste, these results imply that the positive electrode in cells having SnSO$_4$ paste material in accordance with the present invention should also be on the order of 1% tin rather than 3% tin.

Figure 10:
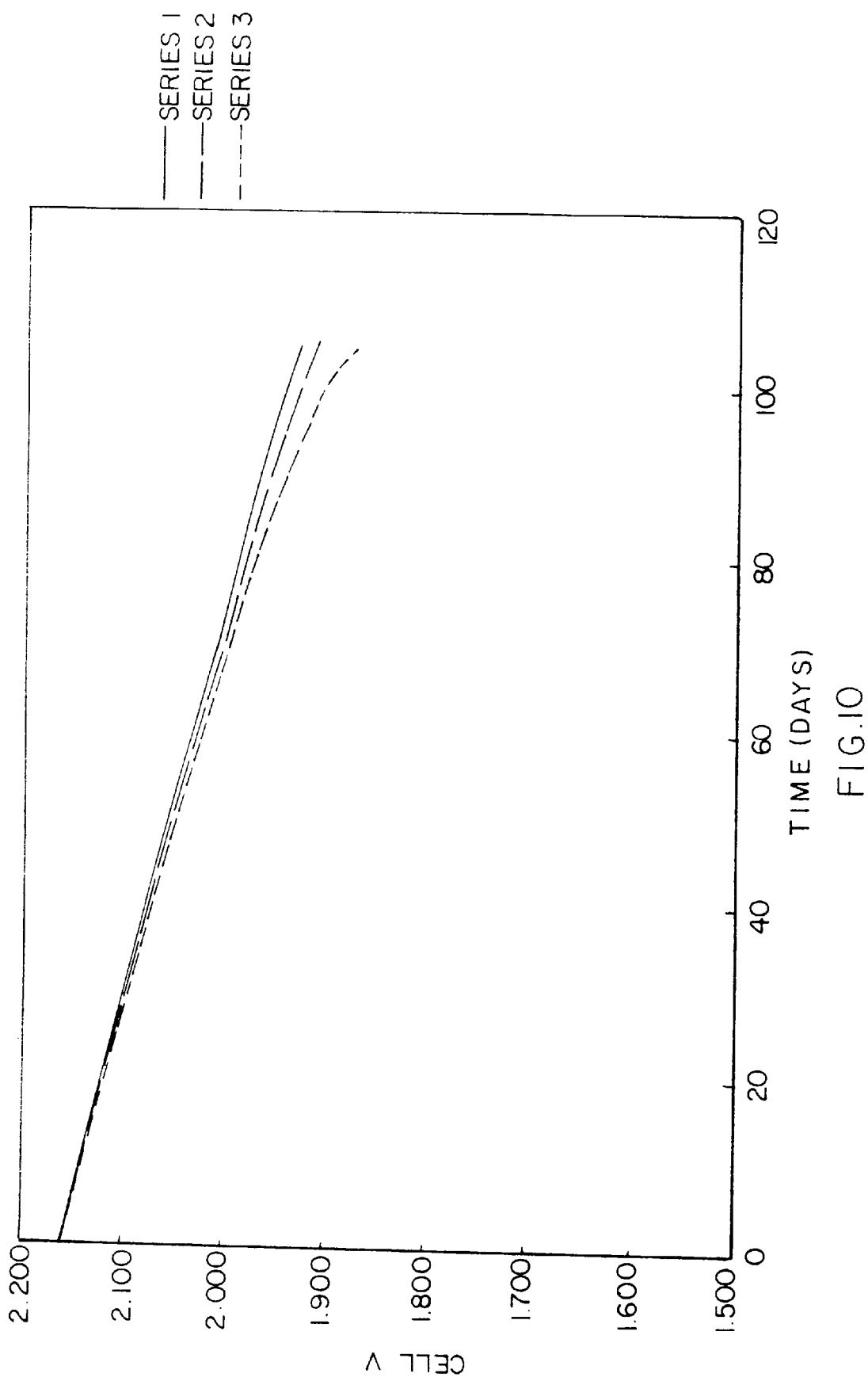
Figure 11:
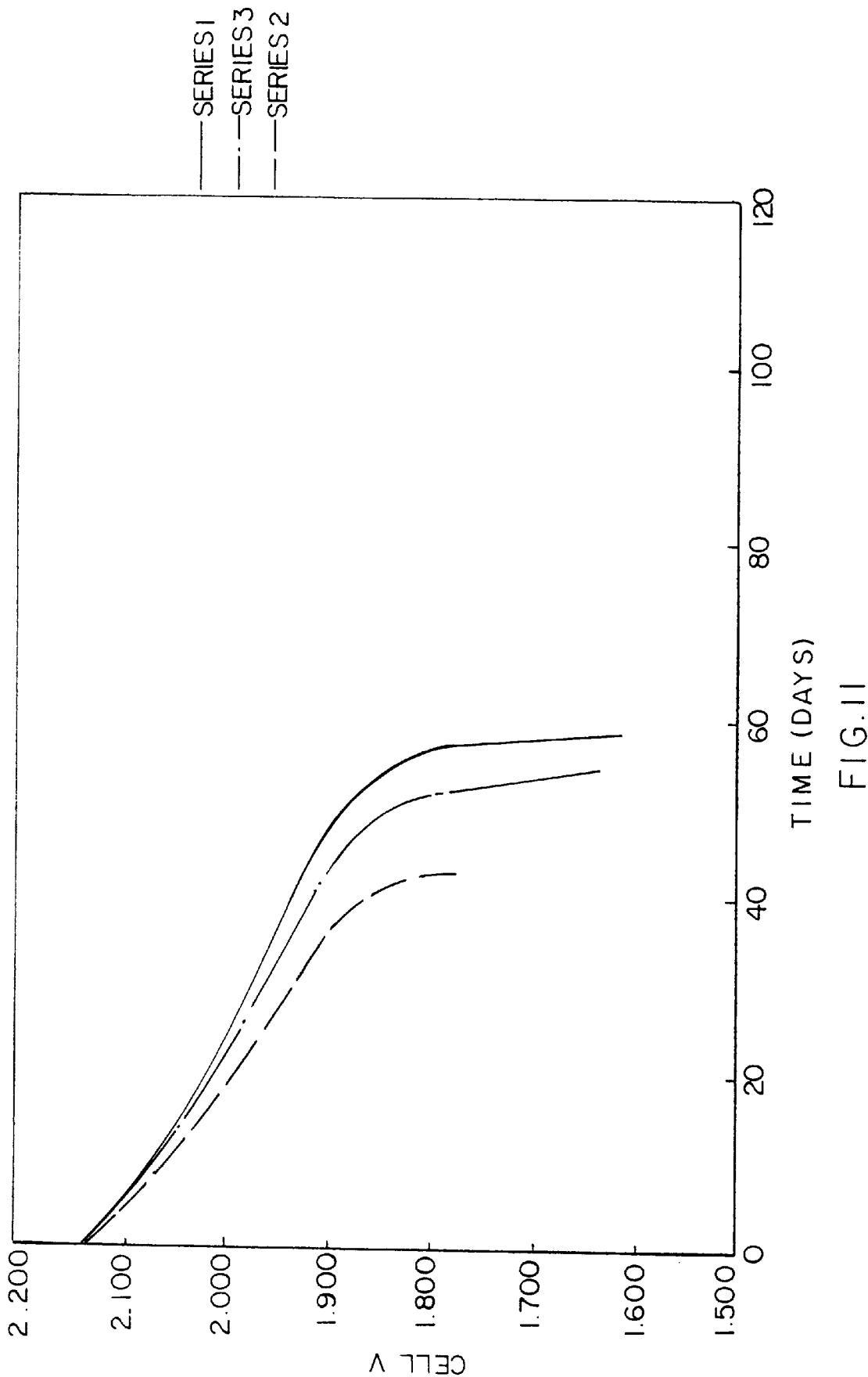

The graphs of FIGS. 10 and 11 illustrate this same point through another set of tests. FIG. 10 shows the self discharge of a set of three test samples over a period of 105 days at an elevated temperature of 50° C. It is believed that this elevated temperature accelerates the self discharge of lead acid cells by a factor of about 6. It can be seen that even at this elevated temperature the test samples did not exhibit any abrupt drop-off in open circuit voltage over a period of 105 days. This suggests that the cells would not exhibit abrupt drop-off in open circuit voltage at room temperature over a period in excess of 600 days. This is well beyond the expected storage life of commercial lead-acid cells.

FIG. 11 shows that the self discharge performance is less favorable if the positive electrodes contain 3% rather than 1% tin. The three test samples of FIG. 11 are essentially the same as those of FIG. 10, except that the positive electrode of the FIG. 11 cells is approximately 3% tin. It can be seen that the open circuit voltage of the FIG. 11 cells drops off abruptly at 40 to 60 days under 50° C. storage.

What is claimed is:

1. A method of manufacturing a lead acid electrochemical cell, comprising: preparing an unsulfated electrochemically active material to which has been added an oxide of lead and a semiconductor; coating said electrochemically active material onto a first electrode of a first polarity; arranging said first electrode adjacent to a second electrode of a polarity opposite the first electrode, the first electrode and second electrode being separated by a separator; and containing said first electrode, second electrode and separator in a container.

2. The method of claim 1, wherein said semiconductor contains tin and is selected from the group consisting of SnSO$_4$, SnO, metallic tin, a tin(II) salt and a tin(IV) salt.

3. The method of claim 2, wherein said semiconductor includes SnSO$_4$.

4. The method of claim 1, wherein said electrochemically active material is approximately 0.001 to 5% SnSO$_4$ by weight.

5. The method of claim 4, wherein said electrochemically active material is approximately 0.1 to 1% SnSO$_4$ by weight.

6. The method of claim 5, wherein said electrochemically active material is approximately 0.3% SnSO$_4$ by weight.

7. The method of claim 1, wherein said first electrode includes a material selected from the group consisting of substantially pure lead and a lead/tin alloy.

8. The method of claim 7, wherein said first electrode is less than 3% tin by weight.

9. The method of claim 8, wherein said first electrode is approximately 0.5 to 1.5% tin by weight.

10. The method of claim 1, wherein said semiconductor is selected from the group consisting of tin, antimony, arsenic, germanium, indium, selenium, gallium, tellurium and combinations thereof.

* * * * *